(12) United States Patent
Eliasson et al.

(10) Patent No.: US 8,094,136 B2
(45) Date of Patent: Jan. 10, 2012

(54) OPTICAL TOUCHPAD WITH THREE-DIMENSIONAL POSITION DETERMINATION

(75) Inventors: Jonas Ove Philip Eliasson, Valby (DK); Niels Agersnap Larsen, Kongens Lyngby (DK); Jens Bastue, Virum (DK); Jens Wagenblast Stubbe Ostergaard, Roskilde (DK)

(73) Assignee: FlatFrog Laboratories AB, Lund (SE)

( * ) Notice: Subject to any disclaimer, the term of this patent is extended or adjusted under 35 U.S.C. 154(b) by 1074 days.

(21) Appl. No.: 11/480,893

(22) Filed: Jul. 6, 2006

(65) Prior Publication Data

US 2008/0007542 A1    Jan. 10, 2008

(51) Int. Cl.
G06F 3/042 (2006.01)
G06F 3/041 (2006.01)
G06K 11/06 (2006.01)
G08C 21/00 (2006.01)

(52) U.S. Cl. ........ 345/175; 345/173; 345/176; 345/156; 178/18.01; 178/18.09

(58) Field of Classification Search ............... 178/18.01, 178/18.09; 345/156–158, 173, 175, 176
See application file for complete search history.

(56) References Cited

U.S. PATENT DOCUMENTS

| | | | |
|---|---|---|---|
| 4,180,702 A | 12/1979 | Sick et al. | 250/227.11 |
| 4,209,255 A | 6/1980 | Heynau et al. | 356/152 |
| 4,346,376 A | 8/1982 | Mallos | 340/712 |
| 4,484,179 A | 11/1984 | Kasday | 340/365 P |
| 4,542,375 A | 9/1985 | Alles et al. | 340/712 |
| 5,572,251 A | 11/1996 | Ogawa | 348/207 |
| 5,600,105 A | 2/1997 | Fukuzaki et al. | 178/19 |
| 5,672,852 A | 9/1997 | Fukuzaki et al. | 178/19 |
| 5,686,942 A | 11/1997 | Ball | 345/158 |
| 5,729,249 A | 3/1998 | Yasutake | 345/173 |
| 5,945,980 A | 8/1999 | Moissev et al. | 345/173 |

(Continued)

FOREIGN PATENT DOCUMENTS

DE     10139147 A1    3/2003
(Continued)

OTHER PUBLICATIONS

Iizuka, Keigo, *Elements of Photonics, vol. I: In Free Space and Special Media*, Jun. 15, 2002, John Wiley & Sons, Inc., Chapter 2, pp. 110-165.

(Continued)

*Primary Examiner* — Bipin Shalwala
*Assistant Examiner* — Ilana Spar
(74) *Attorney, Agent, or Firm* — Pillsbury Winthrop Shaw Pittman LLP

(57) ABSTRACT

An optical touchpad that may be able to provide accurate, reliable information about the position of an object in three-dimensions. The optical touchpad may enable a determination as to whether the object is engaged with the touchpad or hovering just above the touchpad. When the object is in contact with the optical touchpad, the optical touchpad may enable a determination of the force applied by the object to the optical touchpad. The optical touchpad may enable a determination of an object type of the object. These and other determinations of information related to the object may enhance the control provided by the touchpad system to the user as an electronic interface. The operation of the optical touchpad may further enable an enhanced frame rate, reduced optical noise in the optical signal(s) guided to the one or more sensors, augment the ruggedness of the optical touchpad, an enhanced form factor (e.g., thinner), and/or provide other advantages.

20 Claims, 6 Drawing Sheets

U.S. PATENT DOCUMENTS

| | | | |
|---|---|---|---|
| 5,959,617 A | 9/1999 | Bird et al. | 345/182 |
| 6,061,177 A | 5/2000 | Fujimoto | 359/443 |
| 6,227,667 B1 | 5/2001 | Halldorsson et al. | 351/206 |
| 6,380,732 B1 | 4/2002 | Gilboa | 324/207.17 |
| 6,390,370 B1 | 5/2002 | Plesko | 235/462.49 |
| 6,660,964 B1 | 12/2003 | Benderly | 219/121.74 |
| 6,799,141 B1 | 9/2004 | Stoustrup et al. | 702/159 |
| 7,133,031 B2 | 11/2006 | Wang et al. | 345/173 |
| 7,442,914 B2 | 10/2008 | Eliasson et al. | 250/221 |
| 7,465,914 B2 * | 12/2008 | Eliasson et al. | 250/221 |
| 7,847,789 B2 * | 12/2010 | Kolmykov-Zotov et al. | 345/173 |
| 7,995,039 B2 | 8/2011 | Eliasson et al. | 345/173 |
| 8,013,845 B2 | 9/2011 | Ostergaard et al. | 345/176 |
| 8,031,186 B2 | 10/2011 | Ostergaard | 345/176 |
| 2002/0158823 A1 | 10/2002 | Zavracky et al. | 345/87 |
| 2002/0158853 A1 | 10/2002 | Sugawara et al. | 345/176 |
| 2003/0137494 A1 | 7/2003 | Tulbert | 345/173 |
| 2003/0156100 A1 | 8/2003 | Gettemy | 345/204 |
| 2003/0214486 A1 | 11/2003 | Roberts | 345/173 |
| 2004/0027339 A1 | 2/2004 | Schulz | 345/173 |
| 2004/0032401 A1 | 2/2004 | Nakazawa et al. | 345/173 |
| 2004/0238627 A1 | 12/2004 | Silverbrook et al. | 235/382 |
| 2004/0239702 A1 | 12/2004 | Kang et al. | 345/863 |
| 2004/0252091 A1 | 12/2004 | Ma et al. | 345/87 |
| 2004/0252867 A1 | 12/2004 | Lan et al. | 382/124 |
| 2005/0156914 A1 | 7/2005 | Lipman et al. | 345/179 |
| 2005/0212774 A1 | 9/2005 | Ho et al. | 345/173 |
| 2005/0248540 A1 | 11/2005 | Newton | 345/173 |
| 2005/0253834 A1 | 11/2005 | Sakamaki et al. | 345/207 |
| 2006/0001653 A1 | 1/2006 | Smits | 345/176 |
| 2006/0017706 A1 | 1/2006 | Cutherell et al. | 345/173 |
| 2006/0033725 A1 | 2/2006 | Marggraff et al. | 345/179 |
| 2006/0256092 A1 * | 11/2006 | Lee | 345/173 |
| 2006/0279558 A1 | 12/2006 | Van Delden et al. | 345/176 |
| 2006/0281543 A1 | 12/2006 | Sutton et al. | 463/29 |
| 2006/0290684 A1 | 12/2006 | Giraldo et al. | 345/175 |
| 2007/0052684 A1 | 3/2007 | Gruhlke et al. | 345/173 |
| 2007/0125937 A1 | 6/2007 | Eliasson et al. | 250/221 |
| 2007/0152985 A1 | 7/2007 | Ostergaard et al. | 345/176 |
| 2009/0135162 A1 | 5/2009 | Van De Wijdeven et al. | 345/175 |

FOREIGN PATENT DOCUMENTS

| | | |
|---|---|---|
| EP | 1 457 870 | 9/2004 |
| GB | 2 409 515 | 6/2005 |
| WO | WO 84/03186 | 8/1984 |
| WO | WO 2004/081502 | 9/2004 |
| WO | WO 2004/081956 | 9/2004 |
| WO | WO 2005/026938 | 3/2005 |
| WO | WO 2005/029172 | 3/2005 |
| WO | WO 2005/029395 | 3/2005 |
| WO | WO 2005026938 A2 * | 3/2005 |
| WO | WO 2005/125011 | 12/2005 |
| WO | WO 2006/124551 | 11/2006 |

* cited by examiner

OPTICAL TOUCHPAD WITH THREE-DIMENSIONAL POSITION DETERMINATION

FIELD OF THE INVENTION

The invention relates to an optical touchpad system, with a multilayer waveguide that includes at least one total internal reflection mirror, for determining information relating to a position of an object with respect to an interface surface of the optical touchpad system, including three-dimensional position information and/or contact information.

BACKGROUND OF THE INVENTION

Generally, touchpad systems are implemented for a variety of applications. Some of these applications include, computer interfaces, keypads, keyboards, and other applications. Various types of touch pads are known. Optical touch pads have certain advantages over some other types of touch pads at least for some applications. Various types of optical touchpad systems may be used in some or all of these applications. However, conventional optical touchpad systems may include various drawbacks.

For example, conventional optical touchpad systems may be costly, imprecise, bulky, temperamental, fragile, energy inefficient, or may have other weaknesses and/or drawbacks. Further, conventional systems may only be able to detect position of an object (e.g., a fingertip, a palm, a stylus, etc.) when the object is engaged with the touchpad. This may limit the position-detection of optical touchpad systems to detecting the position of the object in the plane of the surface of the touchpad.

While other conventional systems may determine the position of the object in three-dimensions, these systems may include a waveguide that forms a touchpad surface and rely on photosensitive elements positioned on a side of the waveguide opposite from the touchpad surface. From the radiation that passes from the object and completely transverses the waveguide to be received on the opposite side of the waveguide by the photosensitive elements, three-dimensional position information related to the object may be determined. However, these configurations require that the photosensitive elements be dispersed throughout the touchpad underneath the waveguide. This may increase the bulk of the touchpad, decrease a ruggedness of the touchpad, decrease an efficiency of the touchpad, limit the applications for which the touchpad is feasible, and/or include other drawbacks and/or limitations.

These and other limitations of conventional touchpad systems may restrict the types of applications for which touchpad systems may be employed as human/machine interfaces. Various other drawbacks exist with known touchpads, including optical touchpads.

SUMMARY

One aspect of the invention relates to an optical touchpad system including a waveguide, one or more emitters, and one or more detectors. The waveguide may be generally planar and may be defined by a first surface and a second surface. The first surface may an interface surface of the optical touchpad system. The one or more emitters may be optically coupled with the waveguide to emit electromagnetic radiation into the waveguide such that at least a portion of the radiation is guided through the waveguide between the first and second surfaces of the waveguide. The one or more detectors may be optically coupled to the waveguide to receive electromagnetic radiation that is propagating through the waveguide between the first and second surfaces.

In some instances, a portion of the electromagnetic radiation introduced into the waveguide by the emitters may be leaked from within the waveguide to the interface surface and/or through the interface surface where the leaked electromagnetic radiation may be interacted with (e.g., scattered, reflected, etc.) by an object. The object may include an animate object (e.g., one or more fingers) or an inanimate object (e.g., a stylus, a tool, and/or other objects) being positioned by a user. Some of the electromagnetic radiation that is interacted with by the object may return into the waveguide. The waveguide may deflect the returned radiation to travel along a path between the first and second surfaces to become incident on the detectors. The detectors may generate one or more output signals based on the electromagnetic radiation that becomes incident thereon. Based on these output signals, information related to the object may be determined. For example, three-dimensional positional information, object type information, an indication of whether the object is in contact with the interface surface, information related to a force applied to the contact surface by the object, and/or other information related to the object may be determined.

In some implementations, the waveguide may include an intervening layer, a signal layer, and/or other layers. The intervening layer may be defined by a first surface, a second surface and a substantially transparent material having a first index of refraction disposed between the first and the second surface of the interface layer. The signal layer may be defined by a first surface, a second surface and a substantially transparent material having a second index of refraction that is greater than the first index of refraction.

The intervening layer may be disposed in the waveguide between the interface surface and the signal layer such that the second surface of the intervening layer and the first surface of the signal layer are directly adjacent. Due to the difference in indices of refraction between the intervening layer and the signal layer, the boundary between the intervening layer and the signal layer may form a total internal reflection mirror with a predetermined critical angle. The total internal reflection mirror may be formed such that if light (or other electromagnetic radiation) becomes incident on the boundary between the intervening layer and the signal layer from within the signal layer at an angle of incidence that is greater than the critical angle, the light may be reflected back into the signal layer. However, if light becomes incident on the boundary between the intervening layer and the signal layer from within the signal layer at an angle of incidence that is less than the critical angle, the light may pass through the total internal reflection mirror into the intervening layer.

The waveguide and or parts thereof may further include a plurality of microstructures disposed therein. The microstructures may be formed in the waveguide with one or more predetermined properties. The predetermined properties may include a cross-sectional shape, a density, a distribution pattern, an index of refraction, and/or other properties. In some instances, the index of refraction of the microstructures may be greater than the first index of refraction. In these instances, the index of refraction of the microstructures may be less than or equal to the second index of refraction. In one or more implementations, the microstructures may be disposed at the boundary between the signal layer and the intervening layer. The microstructures may be designed to out-couple and/or in-couple light with the signal layer. Out-coupling light to the signal layer may include leaking light out of the signal layer past the total internal reflection mirror and into the intervening layer. The leaked light may include light traveling toward the boundary between the signal layer and the intervening layer with an angle of incidence to the plane of the boundary that is greater than the critical angle of the total internal reflection mirror. In-coupling light may include refracting light passing from the intervening layer into the signal layer such that the in-coupled light becomes incident on the total internal reflection mirror at an angle of incidence greater than the critical angle and is totally internally reflected.

At least one of the layers (e.g. the signal layer) may be optically coupled to one or more electromagnetic radiation emitters to receive electromagnetic radiation (e.g., light) emitted therefrom. One or more of the layers (e.g., the signal layer) may be optically coupled to one or more detectors to guide light thereto at least in part by total internal reflection.

In operation, according to one embodiment, light received by the signal layer is normally trapped within the signal layer at least in part by total internal reflection at the total internal reflection mirror formed at the boundary between the signal layer and the intervening layer. At least a portion of this light becomes incident on the microstructures formed within the waveguide and is leaked out of the signal layer. Some or all of the leaked light propagates to the interface surface of the optical touchpad surface. At the interface surface, or in proximity therewith, a portion of the leaked light interacts with an object (e.g., becomes reflected, scattered, or otherwise interacts with the object). Some of the light interacted with by the object is returned to the waveguide and propagates toward and through the signal layer. The microstructures may alter the path of this light such that it becomes incident on the total internal reflection mirror at an angle of incidence greater than the critical angle and is totally internally reflected. Guided in part by this total internal reflection at the total internal reflection mirror, the light then becomes incident on a detector optically coupled to the signal layer. The detector generates one or more output signals based on the received light that enable information about the position of the object with respect to the interface surface of the optical touchpad system to be determined. For example, this information may include the position of the object in a plane generally parallel with the plane of the interface surface and/or the distance of the object from the interface surface.

This configuration of optical touchpad provides various advantages over known touchpads. For example, the optical touchpad that may be able to provide accurate, reliable information about the position of the object in three-dimensions. The optical touchpad may enable a determination as to whether the object is engaged with the touchpad or hovering just above the touchpad. When the object is in contact with the optical touchpad, the optical touchpad may enable a determination of the force applied by the object to the optical touchpad. The optical touchpad may enable a determination of an object type of the object. These and other determinations of information related to the object may enhance the control provided by the touchpad system to the user as an electronic interface. The operation of the optical touchpad may further enable an enhanced frame rate, reduced optical noise in the optical signal(s) guided to the one or more sensors, augment the ruggedness of the optical touchpad, an enhanced form factor (e.g., thinner), and/or provide other advantages.

These and other objects, features, benefits, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION

Figure 1:
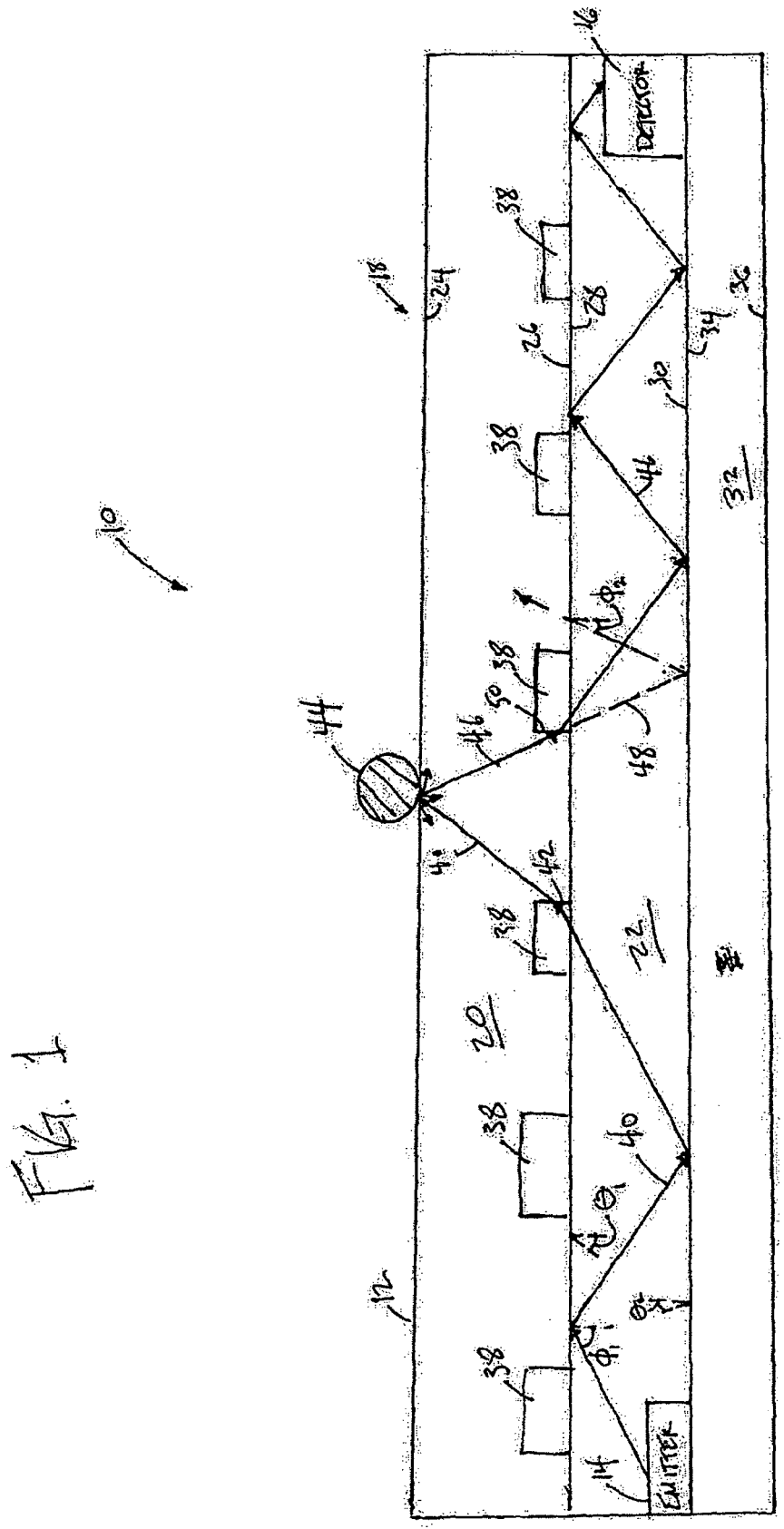
FIG. 1 illustrates an optical touchpad system, in accordance with one or more embodiments of the invention.

FIG. 1 illustrates an optical touchpad system 10 according to one or more embodiments of the invention. Optical touchpad system 10 may include an interface surface 12, one or more emitters 14, one or more detectors 16, and a waveguide 18. Interface surface 12 is configured such that a user can engage interface surface 12 with an object (e.g., a fingertip, a stylus, etc.). Optical touchpad system 10 detects information related to a position of the object with respect to the interface surface 12 (e.g., a distance between the object and interface surface 12, a position of the object in a plane generally parallel with the plane of interface surface 12, etc.).

Emitters 14 emit electromagnetic radiation, and may be optically coupled with waveguide 18 so that electromagnetic radiation emitted by emitters 14 may be directed into waveguide 18. Emitters 14 may include one or more Organic Light Emitting Devices ("OLEDs"), lasers (e.g., diode lasers or other laser sources), LED, HCFL, CCFL, incandescent, halogen, ambient light and/or other electromagnetic radiation sources. In some embodiments, emitters 14 may be disposed at the periphery of waveguide 18 in optical touchpad system 10 (e.g., as illustrated in FIG. 1). However, this is not limiting and alternative configurations exist. For example, emitters 14 may be disposed away from waveguide 18 and electromagnetic radiation produced by emitters 14 may be guided to waveguide 18 by additional optical elements (e.g., one or more optical fibers, etc.). As another example, some or all of emitters 14 may be embedded within waveguide 18 beneath interface layer 12 at locations more central to optical touchpad system than those shown in FIG. 1. In some instances, emitters 14 may be configured to emit electromagnetic radiation over a predetermined solid angle. This predetermined solid angle may be determined to enhance signal detection, enhance efficiency, provide additional electromagnetic radiation for position detection, and/or according to other considerations.

Detectors 16 may monitor one or more properties of electromagnetic radiation. For instance, the one or more properties may include intensity, directionality, frequency, amplitude, amplitude modulation, and/or other properties. Detectors 16 may include one or more photosensitive sensors (e.g., one or more photosensitive diodes, CCD arrays, CMOS arrays, line sensors etc.) that receive electromagnetic radiation, and may output one or more output signals that are indicative of one or more of the properties of the received electromagnetic radiation. In some implementations, detectors 16 may be optically coupled to waveguide 18 to receive electromagnetic radiation from waveguide 18, and may output one or more output signals that are indicative of one or more properties of the electromagnetic radiation received from waveguide 18. Based on these output signals, information about the position of the object with respect to interface surface 12 may be determined.

In some implementations, waveguide 18 may include a plurality of waveguide layers. For example, waveguide 18 may include an intervening layer 20, a signal layer 22, and/or other layers. Intervening layer 20 may be a generally planar layer bounded by a first surface 24 facing toward interface surface 12 and a second surface 26 on a side of intervening layer 20 opposite from first surface 24. Signal layer 22 may be a generally planar layer bounded by a first surface 28 facing toward interface surface 12 and a second surface 30 on a side of signal layer opposite from first surface 28. Intervening layer 20 and/or signal layer 22 may be formed from materials with transparent and/or translucent properties. For example, layers 20 and/or 22 may be formed from one or more fluids, one or more gases, one or more gels, one or more glues, one or more polymers, one or more glasses, one or more crystals, and/or other materials.

As is shown in FIG. 1, intervening layer 20 may be disposed within waveguide 18 between interface surface 12 and signal layer 22 such that second surface 26 of intervening layer 20 abuts first surface 28 of signal layer 22. In some instances the abutment between surfaces 26 and 28 may be direct. In the implementations illustrated in FIG. 1, first surface 24 of intervening layer 20 forms interface surface 12. However, this is not intended to be limiting and in some implementations one or more additional layers of waveguide 18, such as one or more boundary layers and/or other auxiliary layers, may be disposed between intervening layer 20 and interface surface 12.

In some instances, intervening layer 20 is formed of a material (or materials) having a first index of refraction and signal layer 22 is formed of a material (or materials) having a second index of refraction. The second index of refraction is greater than the first index of refraction such that the boundary between intervening layer 20 and signal layer 22 may form a first total internal reflection mirror ("the first TIR mirror") with a predetermined critical angle (illustrated in FIG. 1 as critical angle $\theta_1$. As is discussed further below, the first TIR mirror may totally internally reflect electromagnetic radiation that becomes incident on the first TIR mirror from within signal layer 22 at an angle of incidence that is greater than critical angle $\theta_1$.

Signal layer 22 may be bounded on second side 30 by a base layer 32. Base layer 32 may be defined by a first surface 34 and a second surface 36. In some implementations, such as the implementations illustrated in FIG. 1, base layer 32 may be included as a layer in waveguide 18. In these implementations, second surface 36 may comprise a mounting surface configured to be mounted to a base object. The base object may include virtually any object on which touchpad system 10 may be used as a touchpad. For example, the base object may include an electronic display (e.g., a display monitor, a mobile device, a television, etc.), a keypad, a keyboard, a button, an appliance (e.g., a stove, an air conditioner unit, a washing machine, etc.), a control panel (e.g., an automobile control panel, an airplane control panel, etc.), or other base objects.

In other implementations, base layer 32 may not be included as a layer in waveguide 18. In these implementations, base layer 32 may be formed as an integral part of the base object on which waveguide 18 is disposed. For instance, base layer 32 may include a glass (or other material with transparent and/or translucent properties) layer that forms the screen of an electronic or other display (e.g., a car dashboard, etc.), a window, or another base object. In other implementations (not shown), base layer 32 may be included in waveguide 18 as a composite layer formed from a plurality of sub-layers.

The boundary between base layer 32 and signal layer 22 may be formed such that a reflective surface is created that reflects magnetic radiation that becomes incident on the reflective surface from within signal layer 22 back into signal layer 22. For example, in some instances, base layer 32 may be formed from a material (or materials) with a third index of refraction that is less than the second index of refraction such that a second total internal reflection mirror ("the second TIR mirror") may be formed at the interface of surfaces 30 and 36. The second TIR mirror may have a predetermined critical angle. Electromagnetic radiation incident on the second TIR mirror from within signal layer 22 at an angle of incidence greater than the critical angle of the second TIR mirror may be totally internally reflected back into signal layer 22.

In other instances, all or a portion of base layer 32 may be opaque. In these instances, the reflective surface formed between signal layer 22 and base layer 32 may reflect electromagnetic radiation by reflection other than total internal reflection. For example, the reflection may be a product of a reflective coating, film, or other layer disposed at these boundaries to reflect electromagnetic radiation back into signal layer 22.

According to various implementations, waveguide 18 may include a plurality of microstructures 38 distributed at the boundary between signal layer 22 and intervening layer 20. As will be described further hereafter, microstructures 38 may be formed to receive electromagnetic radiation from signal layer 22 that is traveling with an angle of incidence to the plane of the boundary between signal layer 22 and intervening layer 20 greater than critical angle $\theta_1$ of the first TIR mirror, and to leak at least a portion of the received electromagnetic radiation from signal layer 22 into intervening layer 20. Microstructures 38 may have a fourth index of refraction.

In some instances, microstructures 38 may protrude from the boundary between intervening layer 20 and signal layer 22 into intervening layer 20. In these instances, the fourth index of refraction may be greater than the first index of refraction (index of refraction on intervening layer 20). The fourth index of refraction in these instances may further be less than or equal the second index of refraction (the index of refraction of signal layer 22). In various ones of these instances, microstructures 38 may be integrally with signal layer 22. As one alternative to this, microstructures may be formed separately from signal layer 22. Some of the shapes of microstructures 38, and some of the materials that may be used to form microstructures 38 are discussed further below.

In other instances (not shown), microstructures 38 may protrude into signal layer 22 from the boundary between signal layer 22 and intervening layer 20. In these instances, the fourth index of refraction different than the second index of refraction (e.g., less than or greater than the second index of refraction), and the fourth index of refraction may be different than the first index of refraction (e.g., less than or greater than the first index of refraction). In various ones of these instances, microstructures 38 may be integrally formed with intervening layer 20. In other ones of these instances, microstructures 38 may be formed separately from intervening layer 20.

As is illustrated in FIG. 1, emitter 14 may emit electromagnetic radiation (illustrated in FIG. 1 as electromagnetic radiation 40) into signal layer 22 that becomes incident on the first TIR mirror formed between intervening layer 20 and signal layer 22 at an angle of incidence (illustrated in FIG. 1 as $\phi_1$) that is greater than the critical angle $\theta_1$. Accordingly, electromagnetic radiation 40 may be totally internally reflected back into signal layer 22 by the first TIR mirror. As can further be seen in FIG. 1, electromagnetic radiation 40 may become incident on one of microstructures 38 such that electromagnetic radiation 40 is leaked past the first TIR mirror and into intervening layer 20.

As was mentioned above, microstructures 38 are formed with a fourth index of refraction that is different than (e.g., greater than) the first index of refraction of signal layer 20, and therefore may accept electromagnetic radiation that would be totally internally reflected at the boundary between signal layer 22 and intervening layer 20. Microstructures 38 are also shaped to provide surfaces, such as a surface 42 in FIG. 1, at angles that enable electromagnetic radiation that might otherwise be reflected by the first TIR mirror (e.g., electromagnetic radiation 40) to avoid total internal reflection, and instead be leaked from microstructures 38 into intervening layer 20 by refraction, deflection, and/or total internal mirror deflection.

Electromagnetic radiation 40 leaked into intervening layer 20 by microstructures 38 may propagate to, and in some cases through, interface surface 12. At interface surface 12, or at some position above interface surface 12, electromagnetic radiation 40 may become incident on an object 44. Object 44 may include an animate object (e.g., a fingertip, a palm etc.) or an inanimate object (e.g., a stylus, etc.) being positioned by a user with respect to interface surface 12. As electromagnetic radiation 40 becomes incident on object 44, object 44 may interact with electromagnetic radiation 40 (e.g., reflect, scatter, etc.) to return at least a portion of the electromagnetic radiation incident thereon (illustrated in FIG. 1 as electromagnetic radiation 46) back into waveguide 18.

As electromagnetic radiation 46 reenters waveguide 18, it may be directed into signal layer 22 by one of microstructures 38 such that electromagnetic radiation 46 may be guided within signal layer 22 to the one or more detectors 16. It should be appreciated that without the presence of microstructures 38, electromagnetic radiation 46 would likely propagate along an optical path 48 that would not enable electromagnetic radiation 46 to be guided within signal layer 22 to the one or more detectors 16 at least because the angle of incidence (illustrated in FIG. 1 as angle of incidence $\phi_2$) of optical path 48 with respect to the first TIR mirror (assuming reflection at the boundary between signal layer 22 and base layer 32) would be less than the critical angle $\theta_1$. However, microstructures 38 provide surfaces, such as surface 50, where the difference in refractive index between microstructure 38 and intervening layer 20 bend the path of electromagnetic radiation (e.g., electromagnetic radiation 46) such that electromagnetic radiation 46 may be totally internally reflected by the first TIR mirror when it next becomes incident on the boundary between signal layer 22 and intervening layer 20.

In response to electromagnetic radiation 46 becoming incident on detector 16, detector 16 may output one or more output signals that are related to one or more properties of electromagnetic radiation 46. For example, as was discussed above, the one or more properties may include intensity, directionality, frequency, amplitude, amplitude modulation, and/or other properties. From the one or more output signals, information related to the position of object 44 with respect to interface surface 12 (e.g., a distance from interface surface 12, a position on the plane of interface surface 12, etc.).

Although in FIG. 1 object 44 is illustrated as being in contact with interface surface 12, it should be apparent that in instances in which object 44 is proximate to but not in contact with interface surface 12 (e.g., object 44 is "hovering" over interface surface 12), electromagnetic radiation 40 may pass through interface surface 12 and become incident on object 44 outside of waveguide 18. In cases in which object 44 is not in contact with interface surface 12, object 44 may still interact with electromagnetic radiation outside of waveguide 18 to return a portion of the electromagnetic radiation back to waveguide 18 such that it is directed to detectors 16 (e.g., electromagnetic radiation 46). Just as in the instances illustrated in FIG. 1, electromagnetic radiation that has been interacted with by a hovering object and has been guided to detectors 16 by waveguide 18 may result in output signals being generated by detectors 16 that enable the determination of the position of the hovering object in a plane generally parallel with the plane of interface surface 12.

Although signal layer 22 is illustrated in FIG. 1 as including a single layer that is coupled to both emitters 14 and detectors 16, this implementation is illustrative only and other configurations of signal layer 22 may be employed without departing from the scope of this disclosure. For instance, in another implementation, signal layer 22 may include a first sub-layer and a second sub-layer. A boundary between the first sub-layer and the second sub-layer may form a total internal reflection mirror that totally internally reflects electromagnetic radiation incident thereon from within the first sub-layer at an angle of incidence that is greater than the critical angle of the total internal reflection mirror. The first sub-layer may be coupled to emitters 14 and the second sub-layer may be coupled to detectors 16. In this implementation, microstructures 38 may be disposed within waveguide 18 to out-couple electromagnetic radiation within the first sub-layer that has been received from emitters 14 such that the out-coupled electromagnetic radiation passes out of signal layer 22 and propagates toward interface surface 12 (e.g., such as electromagnetic radiation 40 in FIG. 1). Microstructures 38 may further be formed within waveguide 18 to in-couple electromagnetic radiation that has been directed toward signal layer 22 by an object at or near interface surface 12 (e.g., electromagnetic radiation 48 in FIG. 1) to signal layer 22. This in-coupled electromagnetic radiation may be guided to detectors 16 by the second sub-layer. Separating signal layer 22 into two sub-layers in this manner may decrease an amount of noise in optical system 10, and/or provide other benefits.

One of the purposes of microstructures 38 may include leaking a predetermined relative amount of electromagnetic radiation into and/or out of signal layer 22 (e.g., "in-coupling" and "out-coupling" electromagnetic radiation to signal layer 22) without substantially degrading the view of the base object (and/or base layer 32) through waveguide 18. For example, microstructures 38 may be designed and formed within waveguide 18 to in-couple and out-couple appropriate levels of electromagnetic radiation with minimal diffusion and/or radiation blockage of electromagnetic radiation emanating through waveguide 18 to and/or from the base object.

Various aspects of microstructures 38 may be varied to provide this and other functionality. For instance, the relative size and/or shape of microstructures 38 in a plane generally parallel with the plane of the boundary between intervening layer 20 and signal layer 22 may be varied. Shapes with distinct edges and/or corners may result in "sparkling" or other optical artifacts that may become observable to users when viewing the base object (and/or base layer 32) through waveguide 18. Therefore, in some implementations, microstructures 38 may be round, or oval shaped. As another example, the density of microstructures 38 may be controlled. As yet another example, the material(s) used to form microstructures 38 may be determined to enhance the processing of electromagnetic radiation as described above. Another example of a property of microstructures 38 that may be varied to affect the amount of electromagnetic radiation that is out-coupled and/or in-coupled to signal layer 22 may include the cross-sectional size and/or shape of microstructures 38. A distribution of microstructures 38 within waveguide may be stochastically determined, as more uniform distributions may result in optical artifacts that may be observed by a user.

Although in FIG. 1 microstructures 38 protrude into intervening layer 20 from the boundary between intervening layer 20 and signal layer 22, this is not intended to be limiting. In other implementations, for example, microstructures 38 may protrude into signal layer 22 from the boundary between intervening layer 20 and signal layer 22. As another example, microstructures 38 may be embedded wholly within signal layer 22 and may act as refractive elements to in-couple and out-couple electromagnetic radiation with signal layer 22. In these implementations, the index of refraction of microstructures 38 may be less than the index of refraction of signal layer 22 or less than the indices of refraction of signal layer 22 and intervening layer 20. For example, microstructures 38 may be formed of water, oil, gel (e.g., a low refractive sol-gel, etc.), a low refractive polymer, a gaseous substance (e.g., air, etc.), a mix of a gaseous substance and glass, silicium nitride, diamond, and/or other materials. As one possible example, these refractive microstructures may be formed as air pockets within signal layer 22. Other configurations for microstructures that deflect and/or refract electromagnetic radiation to in-couple and/or out-couple the radiation with signal layer 22 are contemplated. Some examples of alternative cross-sections of microstructures are included in co-pending U.S. patent application Ser. No. 11/480,892, entitled "Optical Touchpad System and Waveguide for Use Therein," and filed Jul. 6, 2006, which is hereby incorporated by reference in its entirety.

In some implementations of the invention, one or more of the various layers and/or structures (e.g., microstructures 38) of waveguide 18 may be formed by printing successive layers and structures on top of each other in sheets. This may enhance a form factor (e.g., thinness) of waveguide 18, a speed and/or cost efficiency of manufacture, and/or provide other enhancements to waveguide 18. In other implementations, conventional embossing and/or molding techniques may be used to create the layers and/or structures in waveguide 18. In implementations in which layers and/or structures within waveguide 18 are formed by printing, one or more of emitters 14, detectors 16, electronic circuitry, or other components of optical touchpad system 10 may be integrally formed with waveguide 18. For example, these components may be printed, laminated, or otherwise integrally formed within one or more of layers 20, 22, or 32 prior to, or concurrent with, the combination of layers 20, 22, and/or 32 in waveguide 18. This may reduce an overall cost of manufacturing optical touchpad system 10, enhance a robustness or ruggedness of optical touchpad system 10, increase an accuracy of alignment of the components in optical touchpad system 10, or provide other advantages. In some instances, one or more of emitters, 14, detectors 16, electronic circuitry, or other components may be formed integrally into one or more waveguide layers separate from waveguide 18, and then the one or more separate waveguide layers may be attached to waveguide 18 to optically couple the components formed on the separate waveguide layer(s) with signal layer 22.

Figure 2:
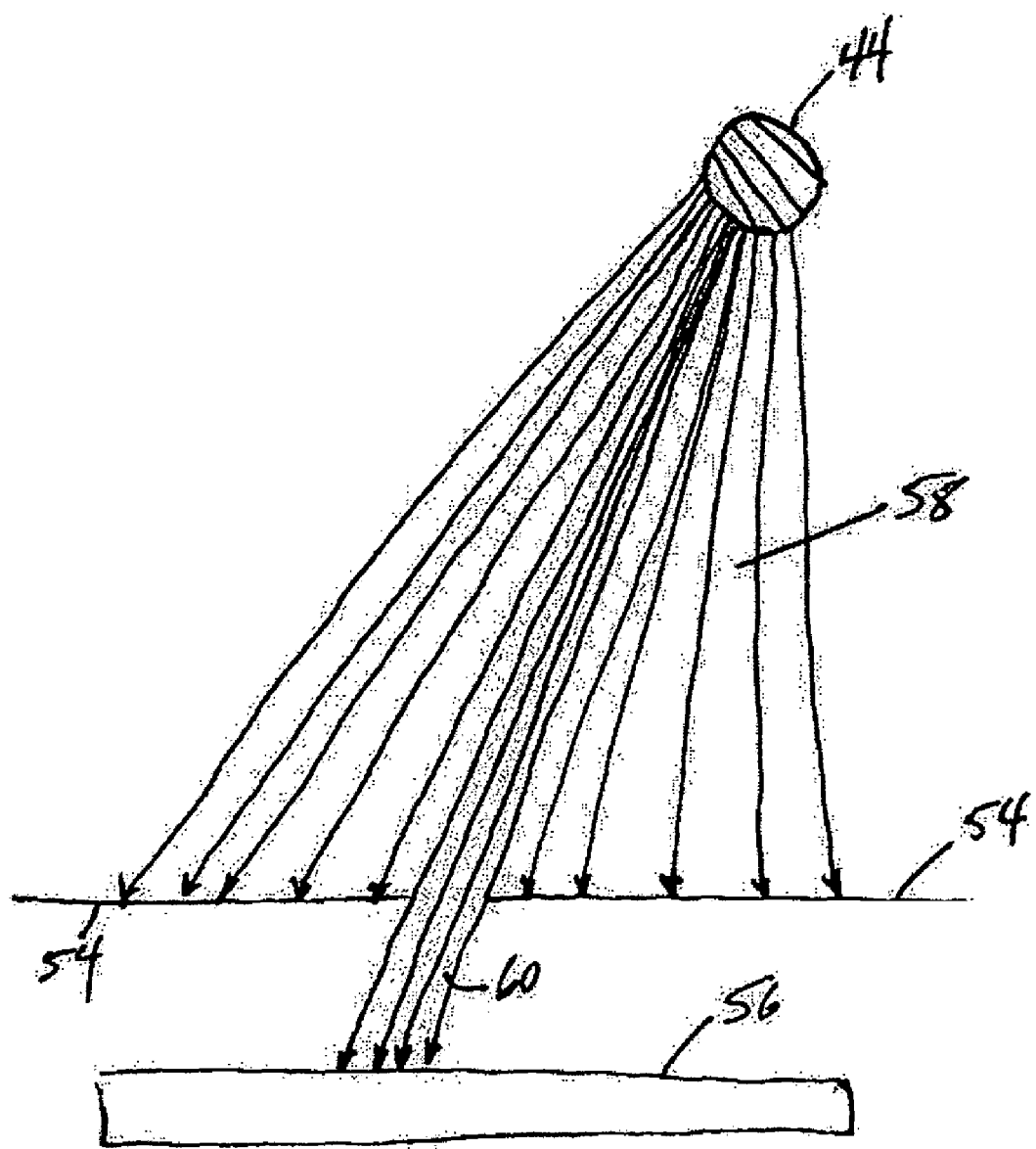
FIG. 2 illustrates a detector, according to one or more embodiments of the invention.

FIG. 2 illustrates a possible configuration of the one or more detectors 16, according to one or more implementations. As shown, detector 16 may include an optical element 54, a photosensitive array 56, and/or other components. Optical element 54 is illustrated as a single aperture. However, in other implementations, optical element 54 may include a refractive element (e.g., a lens, etc.), a reflective element (e.g., a mirror, etc.), a diffractive element, a plurality of apertures and/or sets of apertures, and/or other optical elements. Photosensitive array 56 may include an array of one or more photosensitive elements that receive electromagnetic radiation and generate one or more output signals related to one or more properties of the received electromagnetic radiation. In some instances, photosensitive array 56 may include an at least one-dimensional array. Photosensitive array 56 may include one or more photodiodes, a CCD array, a CMOS array, and/or other arrays of one or more photosensitive elements. Optical element 54 and photosensitive array 56 may be arranged such that electromagnetic radiation delivered to detector 16 by waveguide 18 may become incident first on optical element 54 and then may be provided to photosensitive array 56.

As was discussed above, when object 44 is brought by a user to a position at or near interface surface 12, electromagnetic radiation (illustrated in FIG. 2 as electromagnetic radiation 58) that interacts with object 44 is then directed to detector 16 by waveguide 18. Electromagnetic radiation 58 directed to detector 16 may become incident on optical element 54. Optical element 54 may process electromagnetic radiation 58 such that at least a portion of electromagnetic radiation 58 becomes incident on photosensitive array 56 (illustrated as electromagnetic radiation 60) with an intensity distribution that enables a determination of the position of object 44 in a plane generally parallel with the plane of interface surface 12 with respect to detector 16. In the implementation illustrated in FIG. 2, photosensitive array 56 outputs one or more output signals related to the intensity distribution of electromagnetic radiation 60 in at least one dimension. Based on a known positional relationship between the aperture of optical element 54 and the various photosensitive elements of photosensitive array 56, a direction from detector 16 to the position of object 44 in a plane generally parallel with the plane of interface surface 12 may be determined.

In some implementations, detector 16 may enable determination of other information related to the position of object 44, and/or other information about object 44. For example, detector 16 may enable determination of an object type of object 44. The object type of object 44 may include one or more fingertips, a stylus, a tool, and//or other object types. The object type of object 44 may be determined based on an area of the cross-section of object 44 in a plane generally parallel with the plane of interface surface 12. It should be appreciated that the area of the cross-section of object 44 in a plane generally parallel with the plane of interface surface 12 may vary between the different object types. For instance, a fingertip may have a larger cross-sectional area than a stylus or other tool. The object type of object 44 may be determined based on reflective properties object 44. As an example, a stylus or other tool may have a higher reflectivity than a fingertip.

As can be seen in FIG. 2, various properties of object 44 may be determined based on output signals generated by detector 16 that may enable discrimination between different object types. In the case where object 44 includes a fingertip, the cross-sectional area in a plane generally parallel with the plane of interface surface 12 may be observed by detector 16 as being different (e.g., larger, oval, etc.) than in cases where object 44 includes a stylus and/or another tool. In the cases in which object 44 includes a fingertip, the intensity of electromagnetic radiation that has interacted with object 44 and been provided to detector 16 may be lower than in cases in which object 44 includes a stylus and/or another tool. These and/or other differences between the way different object types interact with electromagnetic radiation may enable the determination of the object type of object 44 based on the output signals generated by detector 16.

Figure 3:
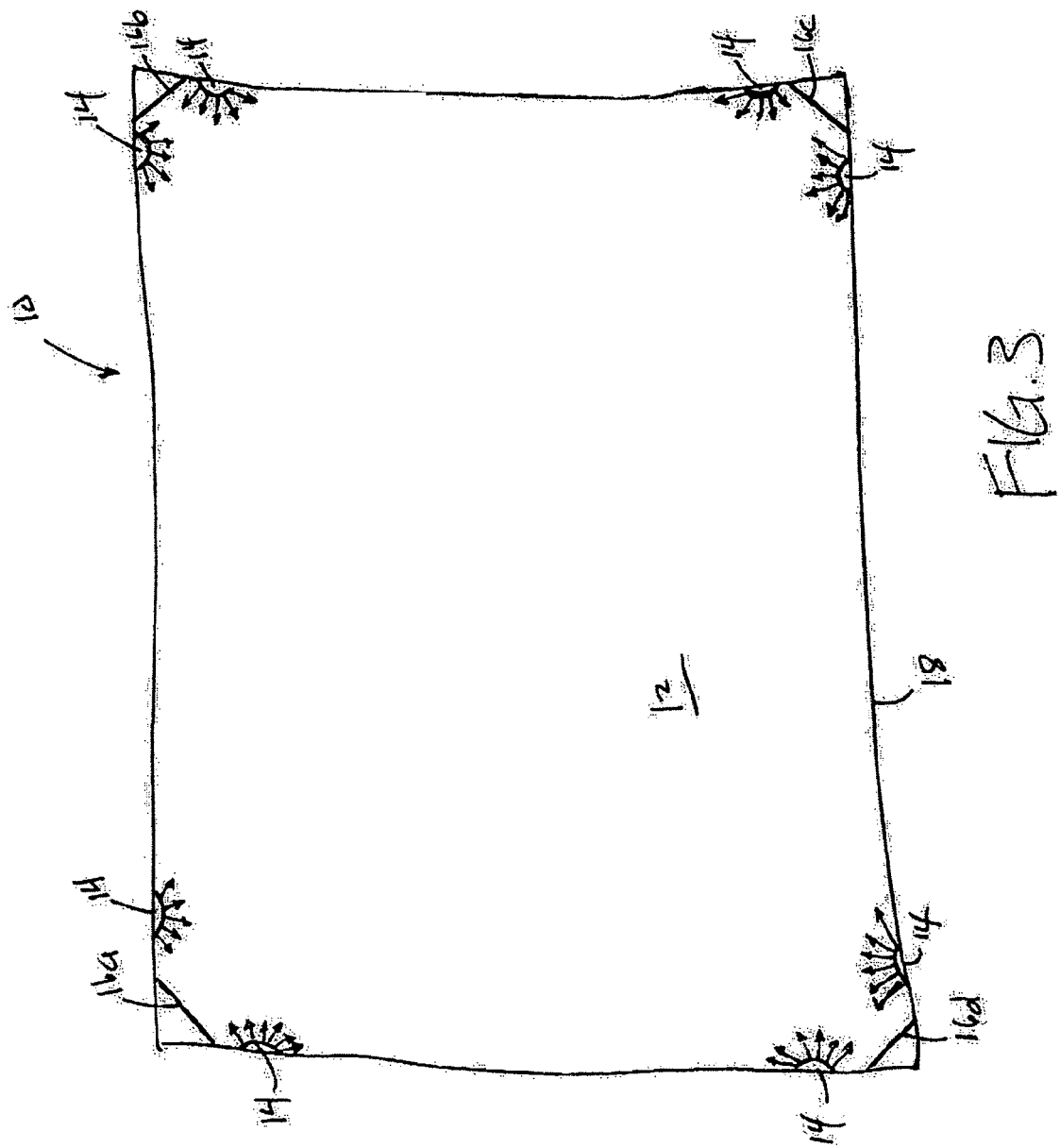
FIG. 3 illustrates an optical touchpad system, in accordance with one or more embodiments of the invention.

FIG. 3 illustrates a configuration of optical touchpad system 10, according to one or more implementations. In the implementations of FIG. 3, optical touchpad system 10 may include waveguide 18, emitters 14, and detectors 16. Emitters 14 shown in FIG. 3 may be provided at opposing positions at the periphery of waveguide 18 (e.g., at the corners) to emit electromagnetic radiation into waveguide 18. Emitters 14 may be adapted to provide radiation in a dispersive manner such that the combined emissions of emitters 14 may combine to create a substantially omni-directional field of electromagnetic radiation, with respect to directionality in a plane generally parallel with the plane of interface surface 12. In some implementations, one or more optical elements may be formed within waveguide 18 to direct electromagnetic radiation emitted in one direction with respect the general plane of waveguide 18 into a plurality of directions with respect to the general plane of waveguide 18. This may enable electromagnetic radiation from emitters 14 to travel through waveguide 18 on an increased number of paths without increasing the number of emitters 14. The one or more optical elements may include refractive microstructures embedded within the signal layer, reflective structures (e.g., mirrors, half mirrors, etc.) embedded within the signal layer, diffractive structures embedded within the signal layer, and/or other optical elements.

Waveguide 18 may include a signal layer that is coupled to emitters 14 and detectors 16. Waveguide 18 may include a plurality of microstructures formed within waveguide 18 to out-couple and in-couple electromagnetic radiation to the signal layer. In some implementations, waveguide 18 may operate in a manner similar to the implementations of waveguide 18 described above. This may include a signal layer that is formed as a single layer, or a signal layer that is formed as a plurality from a plurality of sub-layers. For example, the signal layer may include a first sub-layer optically coupled with emitters 14 and a second sub-layer optically coupled with detectors 16, as was mentioned above. As another example, each of emitters 14 and detectors 16 may be coupled to a separate sub-layer formed within the signal layer. As yet another example, the signal layer may include a plurality of sub-layers with each sub-layer being optically coupled to a predetermined set of emitters 14 and/or detectors 16.

Detectors 16 may be provided at opposing positions on the periphery of waveguide 18 (e.g., at the corners) to receive electromagnetic radiation from waveguide 18. Detectors 16 may generate output signals in response to the received electromagnetic radiation that enable information related to the position of an object with respect to interface surface 12 of optical touchpad system 10, and/or other information related to the object to be determined. In some instances, each detector 16 may enable a determination of a direction (in a plane generally parallel with the plane of interface surface 12) from that detector 16 to the position of the object when the object is positioned at or near interface surface 12. For example, detectors 16 may include an optical element and a photosensitive array, as was described above with respect to FIG. 2

By aggregating the directional measurements of the position of the object enabled by detectors 16, the position of the object in a plane generally parallel with the plane of interface surface 12 may be determined. In one implementation, the directional measurements of some or all of the possible pairings of detectors 16 may be used to determine a separate positional determination by triangulation, and then these positional determinations may be aggregated to provide a determination of the position of the object in a plane generally parallel with the plane of interface surface 12. For example, referring to FIG. 3, the directional measurements of a first one of detectors 16 (illustrated as 16*a*) and a second one of detectors 16 (illustrated as 16*b*) may enable a first positional determination, detector 16*b* and a third one of detectors 16 (illustrated as 16*c*) may enable a second positional determination, detector 16*c* and a fourth one of detectors 16 (illustrated as 16*d*) may enable a third positional determination, detector 16*b* and detector 16*c* may enable a fourth positional determination, and so on. Then these separate positional determinations may be averaged to provide a final determination of the position of the object in a plane generally parallel with the plane of interface surface 12. Aggregating the separate positional determinations may provide an enhanced accuracy by correcting for various forms of systematic noise. For example, as will be discussed further below, the movement of the object toward or away from interface surface 12 may shift the directional reading of some or all of detectors 16. However, by aggregating the separate positional determinations, inaccuracies due to these shifts may be reduced.

It should be appreciated that the configuration of emitters 14 and detectors 16 illustrated in FIG. 3 are not meant to be limiting, and that other implementations may include providing emitters 14 and detectors 16 at alternative locations with respect to waveguide 18. Further, the number of emitters 14 and detectors 16 are also illustrative, and other implementation may utilize more or less emitters 14 and/or detectors 16.

In some implementations of optical touchpad system 10, including the configuration described above with respect to FIG. 3, various mechanisms may be implemented to reduce noise in optical system 10 caused by ambient radiation. For example, wavelength-specific emitters and/or detectors may be used. As another example, emitters 14 may be pulsed. For instance, emitters 14 may include high intensity sources coupled with capacitors to output short, high intensity bursts. In some implementations, emitters 14 may be pulsed (or otherwise modulated) at different frequencies to reduce noise caused internally by the emitters. Controlling the wavelengths and/or the amplitude of emitters 14 may further enable discrimination between optical signals received by detectors 16 from separate ones of emitter 14 (or from groups of emitters with similar outputs). This discrimination may enable an enhanced accuracy in determining information related to the position of the object, and/or other information related to the object, based on the output signals generated by detectors 16.

Another source of noise associated with ambient light within optical touchpad system 10 may include the microstructures formed within waveguide 18. The amount of noise caused by the microstructures in-coupling ambient radiation to the signal layer may be a function of the total area of the microstructures in the plane of interface surface 12 to the total area of interface surface 12. In some implementations, this ratio may be below about 1/20. In one implementation, the ratio may be between about 1/50 and about 1/10,000. This ratio may be enhanced by various mechanisms. For example, a density distribution, cross-sectional shapes and/or sizes, shapes in a plane generally parallel with the plane of interface surface 12, differences in refractive index between the layers of waveguide 18 (e.g., due to materials used), and/or mechanisms that reduce the ratio of the microstructures in the plane of interface surface 12 to the total area of interface surface 12. Enhancing this ratio may provide other augmentations to optical touchpad system 10, such as reducing a photon budget of optical system 10, augmenting an efficiency of optical system 10, and/or other augmentations.

Figure 4:
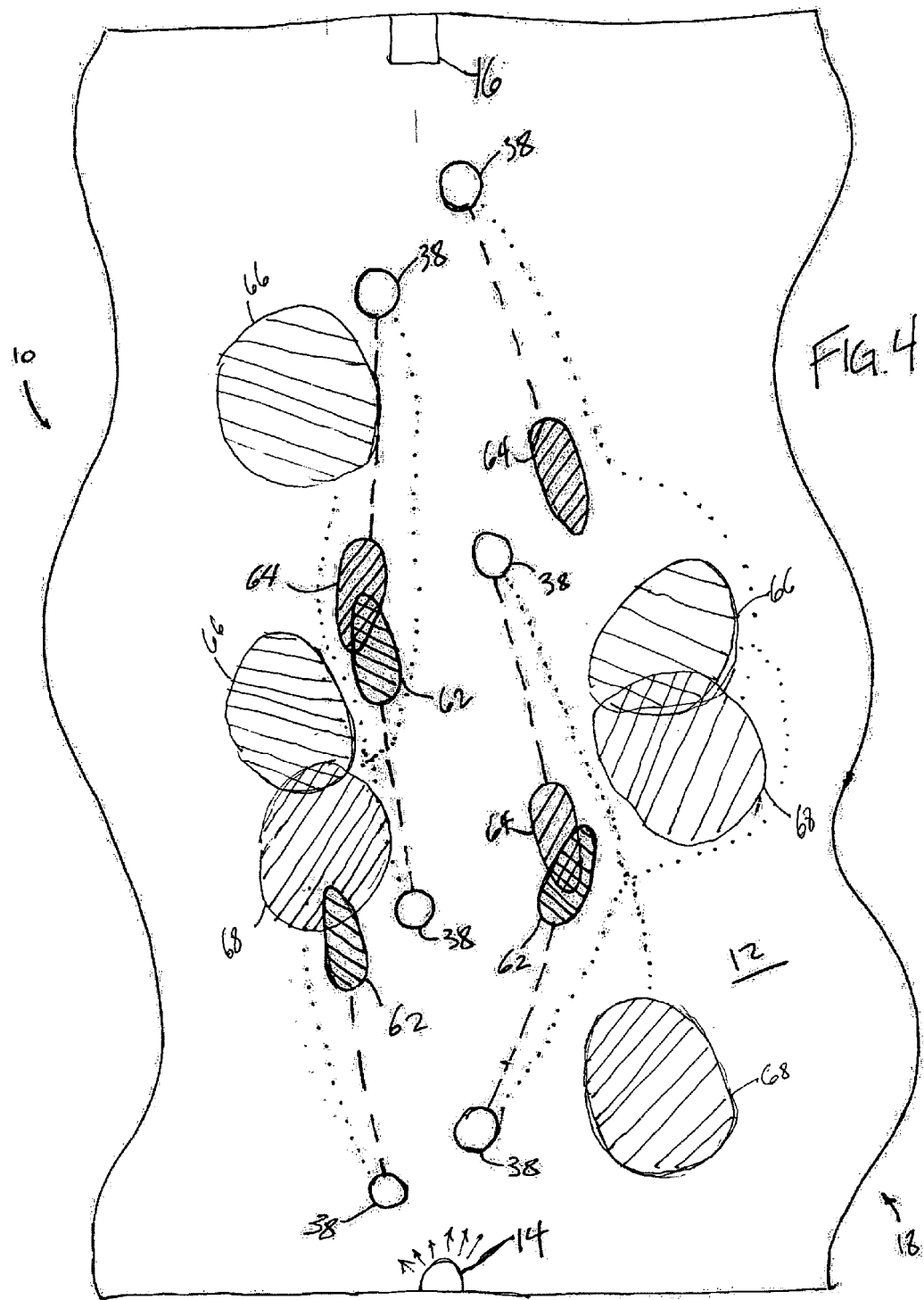
FIG. 4 illustrates a portion of an optical touchpad system, according to one or more embodiments of the invention.

FIG. 4 illustrates a view of a portion of interface surface 12, with emitter 14, detector 16 and microstructures 38 formed beneath interface surface 12. As electromagnetic radiation from emitter 14 is out-coupled from the signal layer (not shown in FIG. 4) by microstructures 38, for example as was described above respect to FIG. 1, the out-coupled electromagnetic radiation from each microstructure 38 may become incident on interface surface 12 in an illumination area 62 on interface surface 12 that corresponds to emitter 14 and that particular microstructure 38. For illustrative purposes, in FIG. 4 the corresponding microstructures 38 and illumination areas 62 are linked by a dashed line. Similarly, electromagnetic radiation that is scattered and/or reflected by an object that is in contact with interface surface 12 may be in-coupled to the signal layer by a given microstructure 38 and guided by the signal layer to detector 16 only from a detection area 64 on interface surface 12 that corresponds to the given microstructure 38 and detector 16. For purposes of illustration, correspondence between microstructures 38 and detection areas on interface surface 12 is indicated by a dashed line.

Detection of an object in contact with interface surface 12 by detector 16 may only take place at locations on interface surface 12 where one of illumination areas 62 overlaps with one of detection areas 64. This means that the portions of illumination areas 62 which do not overlap with detection areas 64 may create spaces where electromagnetic radiation may be expended by optical touchpad system 10 without a possibility of providing detection results (e.g., wasted out-coupled electromagnetic radiation). Portions of detection areas 64 that do not overlap with portions of illumination areas 62 may form areas where noise in the form of ambient radiation may be introduced to optical touchpad system 10 without providing detection results. Further, areas on interface surface 12 where there is not overlap between illumination areas and detection areas 64 may form "dead" areas where the presence of the object at interface surface 12 may not be detected by optical system 10.

It should be appreciated that FIG. 4 illustrates a relatively simple implementation of optical touchpad system 10. In other implementations, the use of multiple emitters and/or detectors, along with additional microstructures, may reduce the amount of "dead" spaces on interface 12. For example, optical touchpad system 10 may be formed such that any "dead"spaces present on interface surface 12 are dispersed from each other. System 10 may further be formed such that the any "dead" spaces on interface surface 12 may be sufficiently small in size that an object engaging interface surface 12 at one of the "dead" spaces would also be in contact with at least adjacent area on interface surface 12 one of illumination areas 62 over laps one of detection areas 64. This would ensure that the position of the object would still be measurable (and/or other information could be determined) while the object is in contact with one of the sufficiently small "dead" spaces.

The distribution of microstructures 38 in waveguide 18 may further be designed to reduce optical noise caused by electromagnetic radiation from emitter 14 being directed to detector 16 without first interacting with an object. For example, at illumination areas 62 the difference in refractive index between waveguide 18 at interface surface 12 and ambient air may cause a portion of the electromagnetic radiation that is out-coupled to illumination areas 62 to be either totally internally reflected or Fresnel reflected. This reflected radiation may then be in-coupled back to the signal layer of waveguide 18. Microstructures 38 may be disposed within waveguide 18 such that the position of emitter 14, a given one of microstructures 38, illumination area 62 corresponding to the given microstructure 38, and detector 16 are not co-axial in the plane of interface surface 12. Thus, any electromagnetic radiation out-coupled by the given microstructure 38 that is reflected at illumination area 62 corresponding to the given microstructure 38 will not be directed to detector 16 without interacting with an object, even if the reflected radiation is again in-coupled to the signal layer of waveguide 18.

FIG. 4 further illustrates illumination areas 66 that represent areas in a plane some distance d above interface surface 12 to which electromagnetic radiation may be out-coupled from the signal layer by microstructures 38. Correspondence between microstructures 38 and illumination areas 66 is represented by a dotted line. Similarly, detection areas 68 represent areas in a plane generally parallel with interface surface 12 at distance d above interface surface 12 where electromagnetic radiation that is scattered and/or reflected by an object positioned at distance d above interface surface 12 may be in-coupled by microstructures 38 to detector 16. Correspondence between microstructures 38 and detection areas 68 is represented by a dotted line. It should be appreciated that illumination areas 66 represent cross-sections of volumes made of the radiation that leaves waveguide 18 at illumination areas 62 on interface surface 12 and propagates out into ambient atmosphere, wherein the cross-sections are taken at a plane substantially parallel to interface surface 12 located at the distance d from interface surface 12. Similarly, detection areas 68 represent cross-sections of volumes made up of the paths that radiation may take to be in-coupled to the signal layer of waveguide 18 via detection areas 64 by microstructures 38, wherein these cross-sections are also taken at the plane located at the distance d from interface surface 12.

Since the refractive index of waveguide 18 is greater than the index of refraction of ambient atmosphere, electromagnetic radiation that leaves waveguide 18 at illumination areas 62 is refracted at this boundary. This refraction may diffuse the electromagnetic radiation from illumination areas 62 such that illumination areas 66 at the distance d from interface surface 12 are somewhat larger than illumination areas 62. However, due to this diffusion of the electromagnetic radiation, the radiation in illumination areas 66 may decrease in density and/or intensity as the distance d increases. Further, the refraction of electromagnetic radiation exiting waveguide 18 at illumination areas 62 may cause a relatively large portion of the exiting radiation to be leave waveguide 18 from interface surface 12 with large angles of refraction and propagate through the air just above interface surface 12. While some of the electromagnetic radiation may leave interface surface 12 at smaller angles of refraction, this radiation will typically be more diffuse and have a lower density and/or intensity than the radiation that propagates just above interface surface 12.

Although the size of illumination areas 66 may be larger as d increases (leading to fewer "dead" spaces in the plane located at the distance d), the amount of electromagnetic radiation in illumination areas 66 that interacts with an object located at the distance d may decrease as d increases. This is at least in part because of the diffusion of the electromagnetic radiation that leaves waveguide 18 at illumination areas 62 on interface surface 12. Since the amount of radiation available to interact with the object decreases as d increase, the amount of electromagnetic radiation that is directed from the object to detector 16 by the signal layer will also decrease as d decreases. In some implementations, detector 16 may generate one or more output signals that relate to an amount of electromagnetic radiation (e.g., intensity, density, etc.) received by detector 16. Thus, based on the amount of radiation received by detector 16, as indicated by the one or more output signals generated by detector 16, a distance (the distance d) between the object and interface surface 12 may be determined. For example, optical touchpad system 10 may be calibrated so that the indication of the amount electromagnetic radiation received from the object at detector 16 may be converted to a reading of the distance d between interface surface 12 and the object.

In FIG. 4, microstructures 38 have been illustrated as being substantially omni-directional. However, in other implementations, some or all of microstructures 38 may be facetted to provide electromagnetic radiation out of and/or into the signal layer in paths that transverse the paths that the electromagnetic radiation followed to microstructures 38. For instance, this may skew, or tilt, the path of electromagnetic radiation with reference to the plane of interface surface 12 as the electromagnetic radiation proceeds from the signal layer to an object and/or from an object to the signal layer. In these implementations, as an object moves toward or away from interface surface 12, the object may move through illumination and/or detection areas that correspond to different microstructures that are facetted in different orientations. This may cause the directionality of the electromagnetic radiation received by detector 16 from the object to change as the object moves toward or away from interface surface 12. Other phenomena may also alter the directionality of the electromagnetic radiation received by detector 16 as the object moves toward or away from interface surface 12. For example, even in substantially omni-directional microstructures (e.g., the round microstructures of FIG. 4) a portion of the electromagnetic radiation that becomes incident thereon may be directionally skewed. Further, imperfections in omni-directional microstructures, imperfections in one or more of the internal surfaces of waveguide 18, imperfections and/or texturing present at interface surface 12, and/or other phenomena may change the directionality of the received electromagnetic radiation in this manner.

According to various implementations, microstructures 38 may be distributed within waveguide 18 to selectively out-couple electromagnetic radiation to and in-couple electromagnetic radiation from one or more predetermined areas on interface surface 12. In these implementations, the one or more predetermined areas may form interface areas where a user may provide input to optical touchpad system 10 by providing an object at or near interface surface 12 within one of the interface areas. This may leave one or more areas on interface surface 12 as "dead" areas where no detection and/or irradiation take place. Therefore, if the user provides an object at or near interface surface 12 outside of the interface area(s) (e.g., at a dead area), optical system 10 may not receive input. This feature may further be used to enhance the ratio of the total area of microstructures 38 in the plane of interface surface 12 to the total area of interface surface 12 by eliminating the need for microstructures that in-couple and/or out-couple electromagnetic radiation to areas on interface surface 12 that may not be designed to receive input.

In some implementations, the creation of discrete interface areas may be used to define buttons, keys, scroll pad areas, dials, and/or other input areas on interface surface 12. In various ones of these implementations, discrete interface areas that create buttons or keys on interface surface 12 may be used in conjunction with the ability of optical touchpad system 10 to determine whether an object is in contact with the interface areas, or hovering just above the interface areas. This ability is discussed further below.

The principles discussed above with respect to the determination of a distance d between an object and interface 12 may be implemented in implementations of optical touchpad system 10 capable of determining a position of the object in a plane generally parallel with the plane of interface surface 12 to provide a position of the object in three-dimensions with respect to interface surface 12. For example, the implementations of optical touchpad system 10 illustrated in FIG. 3 may implement these principles to determine the distance d based on the intensity of the electromagnetic radiation received by each of detectors 16. For instance, in the implementations of FIG. 3, a separate determination of the distance d may be made for each of detectors 16, and the separate determinations of d may be aggregated to provide a final determination of d.

Figure 5:
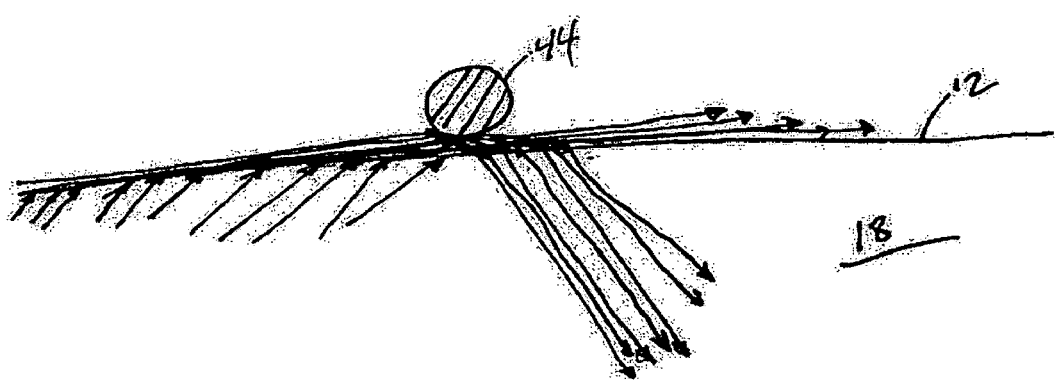
FIG. 5 illustrates an object in the proximity of an interface surface of an optical touchpad surface, in accordance with one or more embodiments of the invention.

In some implementations, based on the output signals generated by detectors 16, a determination may be made as to whether or not an object is in contact with interface surface 12. For example, FIG. 5 illustrates object 44 approaching interface surface 12. As was discussed above, the difference in indices of refraction between ambient air and waveguide 18 at interface surface 12 may cause a relatively large proportion of the electromagnetic radiation that is leaked from waveguide 18 at interface surface 12 to travel in the air above interface surface 12 at extremely small angles of refraction to interface surface 12. Additionally, this boundary between waveguide 18 and ambient atmosphere at interface surface 12 may totally internally reflect a portion of the electromagnetic radiation that is out-coupled from the signal layer. As was also discussed above, as object 44 approaches interface surface 12, the amount of electromagnetic radiation the object 44 interacts with may increase. As can be seen in FIG. 5, this amount of radiation increases somewhat drastically just above interface surface 12. When object 44 is located just above interface surface 12 (as is illustrated in FIG. 5), object 44 may interact with this electromagnetic radiation to forward reflect and/or forward scatter the electromagnetic radiation toward one or more detectors opposite in direction from which the electromagnetic radiation was emitted.

Figure 6:
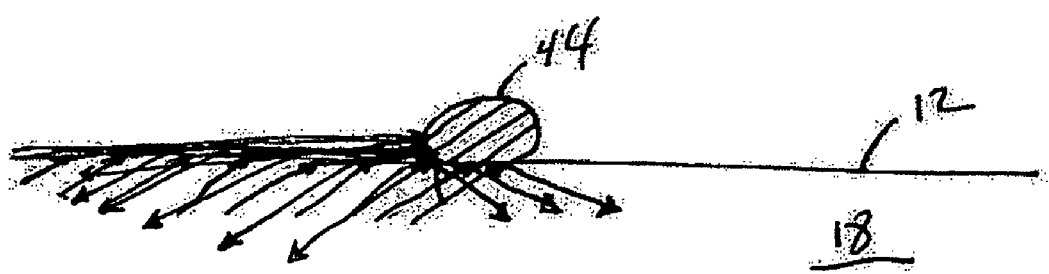
FIG. 6 illustrates an object in contact with an interface surface of an optical touchpad system, according to one or more embodiments of the invention.

As is illustrated in FIG. 6, when object 44 comes into contact with interface surface 12, the interaction between object 44 and the electromagnetic radiation traveling just above interface surface 12 at extremely large angles of refraction to interface surface 12, as observed by the detectors, may be changed. More specifically, just before object 44 comes into contact with interface surface 12, as illustrated in FIG. 6, object 44 begins to back-reflect and/or back-scatter radiation back towards the direction from which it was emitted. As object 44 continues to approach interface surface 12 and more and more of the electromagnetic radiation traveling just above interface surface 12 becomes back-reflected and/or back-scatters, a relatively sharp decrease may be seen in the amount of electromagnetic radiation received by the opposite from the emitters that emitted the radiation. By monitoring the output signals generated by these detectors for the decrease in intensity caused by the back-reflecting and/or back-scattering of electromagnetic radiation by object 44 as illustrated in FIG. 6, a determination as to whether object 44 is in contact with interface surface 12 or hovering just above interface surface 12 may be made.

The back-reflecting and/or back-scattering of electromagnetic radiation by object 44 while object 44 is in contact with interface surface 12 may further be used to determine a directional orientation (e.g., tilt) of object 44 with respect to interface surface 12. For example, in implementations in which object 44 includes a pen, or other elongated tool, a directional orientation of the pen may be determined by an increased amount back-scattered and/or back-reflected electromagnetic radiation in the direction in which the pen is tilted with respect to a perpendicular to the plane of interface surface 12. The determination of the directionality of the back-scattered and/or back-reflected radiation, in configurations of system 10 including multiple emitters may be facilitated by modulating the emitters to enable signal discrimination, as was discussed above.

Other aspects of the interaction between object 44 and electromagnetic radiation out-coupled and in-coupled to signal layer 22 may used to determine when contact with interface surface 12 has been made by object 44. For example, as was mentioned above, not all of the electromagnetic radiation that is out-coupled from the signal layer leaves waveguide 18 at interface surface 12. Some of this electromagnetic radiation may be totally internally reflected or Fresnel reflected at interface surface 12. When object 44 comes into contact with interface surface 12, the radiation that previously was totally internally reflected and/or Fresnel reflected at interface surface 12 may instead interact with object 44 (e.g., because the index of refraction of object 44 may be different than the index of refraction of ambient air) and be provided to the detectors. For this reason, contact between object 44 and interface surface 12 may sharply increase the amount of electromagnetic radiation that object 44 interacts with and is in-coupled to the signal layer. Therefore, when object 44 is moving toward interface surface 12 and the output signals have been indicating a corresponding increase the amount of electromagnetic radiation received by the detectors, a change in the output signals of the detectors indicating a drop in the amount of electromagnetic radiation received, as was described above, followed by a change in the output signals indicating an increase in the amount of electromagnetic radiation received by the detectors, may indicate that object 44 moving toward interface surface 12 has contacted interface surface 12.

As another example, it should be appreciated that when a user engages interface surface 12 with object 44, object 44 may be held more steadily than when the user is holding object 44 at some point above interface surface 12. This is due at least in part to the stabilization provided to object 44 by interface surface 12 when object 44 is in contact with interface surface 12. By monitoring the steadiness of the position of object 44, a determination may be made as to whether object 44 is in contact with interface surface. For instance, if the output signals generated by detectors 16 indicate fluctuation of the position of object 44 below a predetermined fluctuation threshold, a determination may be made that object 44 has made contact with interface surface 12. In some implementations, the predetermined fluctuation threshold may be user selected. Other aspects of the interaction between object 44 and electromagnetic radiation out-coupled and in-coupled to signal layer 22 may be used to determine when contact with interface surface 12 has been made by object 44.

In some implementations of the invention, when object 44 is in contact with interface surface 12, the output signals generated by detectors 16 may be used to determine a force applied by object 44 to interface surface 12. Referring to FIG. 6, as the force applied by object 44 on interface surface 12 increases, an area of the contact between object 44 and interface surface 12 may increase. As was discussed above, in the area of contact between interface surface 12 and object 44 frustration of total internal reflection and/or Fresnel reflection may take place leading to an increased amount of radiation that becomes in-coupled to the signal layer from the object. Therefore, the increase in the area of contact caused by the force applied by object 44 to interface surface 12 may result an increase in the amount of light received by the detectors from the object. Further, as can be seen in FIG. 6, the deformation of interface surface 12 caused by the engagement between object 44 and interface surface 12 enables object 44 to intrude into waveguide 18. This intrusion of object 44 into waveguide 18 enables object to interact with additional electromagnetic radiation, at least some of which may be guided to the detectors. For these and other reasons, when object 44 is in contact with interface surface 12, an amount of electromagnetic radiation that interacts with object 44 at interface surface 12 and is guided to the detectors opposite from the emitters emitting the electromagnetic radiation may increase as the force applied by object 44 increases. Accordingly, the output signals generated by the detectors may be monitored for changes in received electromagnetic radiation indicative of an amount of force applied by object 44 to interface surface 12.

In some implementations, emitters 14 and/or detectors 16 may be operatively coupled to one or more processors. The processors may be operable to control the emission of electromagnetic radiation from emitters 14, receive and process the output signals generated by detectors (e.g., to calculate information related to the position of objects with respect to interface surface 12 as described above), or provide other processing functionality with respect to optical touchpad system 10. In some instances, the processors may include one or more processors external to optical touchpad system 10 (e.g., a host computer that communicates with optical touchpad system 10), one or more processors that are included integrally in optical touchpad system 10, or both.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method of determining information related to a position of an object, the method comprising:
   providing electromagnetic radiation to a signal waveguide layer of a waveguide between a first surface and a second surface of the signal waveguide layer, the waveguide comprising:
   an interface surface that is generally planar and forms a touchpad surface;
   an intervening layer having a first index of refraction and being disposed within the waveguide;
   the signal waveguide layer having a second index of refraction that is greater than the first index of refraction and being disposed within the waveguide abutting the intervening layer on a side of the intervening layer opposite from the outer surface,
   wherein the abutment between the signal waveguide layer and the intervening layer forms a generally planar boundary therebetween, and
   wherein the signal waveguide layer is optically coupled to (i) the one or more emitters to receive electromagnetic radiation emitted therefrom, and (ii) one or more detectors such that the detectors receive electromagnetic radiation from the signal waveguide layer;

a total internal reflection mirror having a predetermined critical angle, the total internal reflection mirror being formed at the boundary between the signal waveguide layer and the intervening layer such that electromagnetic radiation that is incident on the total internal reflection mirror from within the signal waveguide layer is deflected back into the signal waveguide layer if the electromagnetic radiation becomes incident on the total internal reflection mirror at an angle of incidence greater than the critical angle;

a reflective surface formed on a side of the signal waveguide layer opposite from the boundary between the signal waveguide layer and the intervening layer, wherein the reflective surface reflects electromagnetic radiation that is incident on the reflective surface from within the signal waveguide layer back into the signal waveguide layer; and a plurality of microstructures disposed within the waveguide, wherein the microstructures are formed (i) to receive electromagnetic radiation from the signal waveguide layer that is traveling with an angle of incidence to the plane of the boundary between the signal waveguide layer and the intervening layer greater than the critical angle of the total internal reflection mirror, and (ii) to leak at least a portion of the received electromagnetic radiation from the signal waveguide layer into the intervening layer toward the interface surface, wherein the microstructures are further formed such any of the portion of the received electromagnetic radiation that is leaked from the signal waveguide layer by the microstructures that becomes reflected at the boundary between the waveguide and ambient atmosphere to travel back toward the signal waveguide layer will not become incident on any of the one or more detectors;

receiving electromagnetic radiation from between the first surface and the second surface of the signal waveguide layer; and determining a magnitude of a distance between an object in the proximity of the interface surface and the interface surface for a range of possible distance magnitudes between the interface surface and a maximum detectable distance from the interface surface, the magnitude of the distance being determined based on the electromagnetic radiation received from between the first surface and the second surface.

2. The method of claim 1, wherein the distance between the object and the interface surface are determined based on an intensity of the electromagnetic radiation.

3. The method of claim 1, further comprising determining a position of the object in a plane generally parallel with the plane of the interface surface based on the electromagnetic radiation received from between the first surface and the second surface.

4. The method of claim 3, wherein the position of the object in a plane generally parallel with the plane of the interface surface is determined based on the directionality of the received electromagnetic radiation.

5. The method of claim 1, wherein if the distance between the object and the interface surface is zero because the object is in contact with the interface surface, the method further comprises determining a force applied by the object to the interface surface based on the electromagnetic radiation received from between the first surface and the second surface.

6. The method of claim 5, wherein the force applied by the object to the interface surface is determined based on the intensity of the electromagnetic radiation received from between the first surface and the second surface.

7. The method of claim 1, further comprising determining an object type of the object based on the electromagnetic radiation received from between the first surface and the second surface.

8. The method of claim 7, wherein the object type comprises one or more of a finger, a stylus, or a pen.

9. The method of claim 1, further comprising determining a tilt direction of the object with respect to the plane of the interface surface.

10. An optical touchpad system comprising:
one or more emitters configured to emit electromagnetic radiation;
one or more detectors configured to receive electromagnetic radiation and output one or more output signals that correspond to one or more properties of the received electromagnetic radiation; and
a waveguide that guides a portion of the electromagnetic radiation emitted by the emitters to the detectors, the waveguide comprising:
an interface surface that is generally planar and forms a touchpad surface;
an intervening layer having a first index of refraction and being disposed within the waveguide;
a signal layer having a second index of refraction that is greater than the first index of refraction and being disposed within the waveguide abutting the intervening layer on a side of the intervening layer opposite from the outer surface,
wherein the abutment between the signal layer and the intervening layer forms a generally planar boundary therebetween, and
wherein the signal layer is optically coupled to (i) the one or more emitters to receive electromagnetic radiation emitted therefrom, and (ii) the one or more detectors such that the detectors receive electromagnetic radiation from the signal layer;
a total internal reflection mirror having a predetermined critical angle, the total internal reflection mirror being formed at the boundary between the signal layer and the intervening layer such that electromagnetic radiation that is incident on the total internal reflection mirror from within the signal layer is deflected back into the signal layer if the electromagnetic radiation becomes incident on the total internal reflection mirror at an angle of incidence greater than the critical angle;
a reflective surface formed on a side of the signal layer opposite from the boundary between the signal layer and the intervening layer, wherein the reflective surface reflects electromagnetic radiation that is incident on the reflective surface from within the signal layer back into the signal layer; and
a plurality of microstructures disposed within the waveguide, wherein the microstructures are formed (i) to receive electromagnetic radiation from the signal layer that is traveling with an angle of incidence to the plane of the boundary between the signal layer and the intervening layer greater than the critical angle of the total internal reflection mirror, and (ii) to leak at least a portion of the received electromagnetic radiation from the signal layer into the intervening layer toward the interface surface,
wherein the microstructures are further formed such any of the portion of the received electromagnetic radiation that is leaked from the signal layer by the microstructures that becomes reflected at the boundary between the waveguide and ambient atmosphere to travel back toward the signal layer will not become incident on any of the one or more detectors.

11. The optical touchpad system of claim 10, wherein the microstructures are further formed (iii) to receive electromagnetic radiation that has been leaked from the signal layer by the microstructures and has been scattered and/or reflected by an object at or near the interface surface to travel back toward the signal layer at an angle of incidence to the plane of the boundary between the signal layer and the intervening layer that is less than the critical angle of the total internal reflection mirror, and (iv) to bend the path of at least a portion of the received electromagnetic radiation such that the at least a portion of the received electromagnetic radiation is guided to the one or more detectors by the reflective surface and the total internal reflection mirror.

12. The optical touchpad system of claim 10, further comprising
one or more processors configured to receive the one or more output signals from the one or more detectors and determine a magnitude of a distance between an object in the proximity of the interface surface and the interface surface for a range of possible distance magnitudes between the interface surface and a maximum detectable distance from the interface surface, the one or more processors being configured to determine the magnitude of the distance based on the output signals of the one or more detectors.

13. The system of claim 1, wherein the one or more processor determine a position of the object in a plane generally parallel with the plane of the interface surface based on the output signals of the one or more detectors.

14. The system of claim 1, wherein if the distance between the object and the interface surface is zero because the object is in contact with the interface surface, the processor determines a force applied by the object to the interface surface based on the output signals from the one or more detectors.

15. The system of claim 1, wherein the one or more processors determine an object type of the object based on the output signals from the one or more detectors.

16. The system of claim 15, wherein the object type comprises one or more of a finger, a stylus, or a pen.

17. The system of claim 1, wherein the one or more processors determine a tilt direction of the object with respect to the plane of the interface surface based on the output signals from the detectors.

18. The system of claim 1, wherein the one or more properties of the electromagnetic radiation received by the one or more detectors that correspond to the one or more output signals generated by the one or more detectors comprise one or more of an intensity, a directionality, a wavelength, or a modulation.

19. The optical touchpad system of claim 1, wherein the range of possible distance magnitudes includes at least three possible distance magnitudes.

20. The optical touchpad system of claim 1, wherein the one or more processors are further configured to determine a three dimensional position of the object if the object is located within the maximum detectable distance from the interface surface.

* * * * *